United States Patent Office 3,590,113
Patented June 29, 1971

3,590,113
PROCESS FOR THE PRODUCTION OF CONICAL HOLLOW ARTICLES OF REINFORCED SYNTHETIC RESINS
Heinrich Pichler, Mayrwies 155, Salzburg, Austria
No Drawing. Filed Aug. 23, 1968, Ser. No. 754,976
Claims priority, application Austria, Aug. 25, 1967,
A 7,819/67
Int. Cl. B29c 1/04; B29g 1/00
U.S. Cl. 264—327
7 Claims

ABSTRACT OF THE DISCLOSURE

A process for the production of conical articles comprises interposing a resin mixture between two conical molds that are nested one in the other. The inner mold is precooled and the outer mold is preheated prior to the interposition of the resin therebetween. The resin is then allowed to be partially cured into a soft yet solid state. The inner mold is then removed, the resin being maintained in the outer mold so that it is fully cured into a hardened solid article. The outer mold is then cooled to permit withdrawal of the article therefrom.

---

Hardening synthetic resins are reinforced by fibrous materials, particularly glass fibres in the form of mats, weave fabrics or rovings, for improving their mechanical and technological properties. Here a cold curing process can take place. The curing process is started by adding hardener and/or accelerator substances.

In the case of hot-hardening synthetic resin-hardener combinations, the reaction takes place very slowly under normal temperature and is only sufficiently accelerated by temperature increase. Often a noticeable acceleration of the reaction is only obtained under a certain minimum temperature, the heat liberated in this exothermic reaction causing a further temperature increase and thus a further acceleration. This phenomenon is often called the starting of the resin.

In the treatment of hardening resins particular attention is to be paid to the temperature and the development of temperature. It is particularly difficult to separate the mold from the molded article when the mold is to be used again.

It is most difficult to produce slightly conical hollow articles of reinforced synthetic resins, which the present invention refers to. A conical inner mold, corresponding to a truncated cone or truncated pyramid and, if the case may be, a conical outer mold are necessarily required.

Generally the outer mold into which the inner mold may be inserted or nested is provided with a dense jacket in such manner that heating or cooling mediums can be passed between said jacket and the mold, such as steam, hot water, or cooling water.

If the resin and the reinforcement of conical hollow articles of reinforced synthetic resins are provided between the outer and inner mold, no particular difficulties are obtained. Owing to the low temperature, the curing reaction cannot proceed by a noticeable speed. The reaction only starts upon temperature increase of the outer mold, whereby the reaction mixture of resin and hardener including the reinforcement and the inner mold appreciably warm up.

In order to remove the cured hollow article from the outer mold it is first necessary to cool the latter. Owing to this change of temperature the two articles release so that it is possible to remove them without difficulties. The removal of inner mold and hollow article is difficult. If one waits until the hollow article is cooled by heat outlet outwardly, to the outer mold, the hollow article—so to say—shrinks onto the inner mold so that a removal is not possible without destroying the synthetic resin article, at least, until the inner mold is completely cooled, too. This waiting time results in further disadvantages in practice. During the curing process the synthetic resin can combine with the inner mold like an adhesive, which does not ensure effective removal. Moreover, this process requires much time since the heat has to go through the relatively well-insulated synthetic resin.

In the present invention these shortcomings are avoided in that the conical inner mold is cooled at least before inserting the resin into the outer mold heatable for the initiation of the curing reaction. Here the inner mold is removed before the final curing of the resin. The time is chosen in such manner that the resin is solid, but not quite hard. If the hot-removed inner mold were contacted with the fresh hardener-resin mixture without the process of cooling taking place now according to the invention, the curing reaction would start and the filling of the outer mold would not succeed.

In the case of an inner mold for executing the process according to the invention it is not necessary that the latter is provided with bores for the passage of a cooling medium. It can be cooled by dipping, spraying of water, blowing of air or the like. It may be advantageous that the conical inner mold is provided with longitudinal grooves, particularly for increasing the cooling surface. Said grooves form stiffening ribs in the conical hollow article which permit to obtain a higher stiffness of the hollow article with the same or a smaller wall thickness; thus material can be saved in addition.

In order to avoid the starting of the resin-hardener mixture during the filling process upon contact of the latter with the warm inner mold, it has been proved necessary to cool the inner mold to such degree that its temperature is under 50° centigrade while it is filled with resin. If the temperature of the inner mold is chosen as high as possible, in particular above that of the outer mold, further advantages are obtained. The heat loss by heating up the inner mold from the outer mold through the resin is smaller and thus a higher production speed, a better exploitation of the device and greater economy are obtained. Furthermore, the resin is somewhat warmed up by the warm inner mold; thus not only is the viscosity reduced and the wetting of the reinforcement by the resin, but also the smoothness of the surface is improved. The smoothness, in particular of the inner surface of the hollow article, and the temperature difference as low as possible between the filling temperature and the removal temperature of the inner mold facilitate the removal of the inner mold and hollow article. If the inner mold is kept warmer during the inserting of the resin the resin will first have a lower viscosity and will penetrate through the reinforcement from inside outwardly, in particular, if the resin is pressed at the bottom into a stationary mold. Thus air bubbles are not likely to remain adhered to the reinforcement, but rise at the outer surface.

EXAMPLE 1

A tube consisting of 70% by weight of rovings and 30% by weight of unsaturated polyester resin, having a diameter of 250 mm. outside and 225 to 226 mm. inside, slightly conical, and a length of 1 m., is produced within 10 minutes by warming an outer mold to 105° centigrade. The inner mold is removed and is cooled to 30° centigrade by a cooling medium from outside. The rovings impregnated with resin are wound onto the inner mold. The outer mold is maintained at 105° centigrade for 8 minutes and is cooled to 20 centigrade thereafter and the tube is removed. The wound inner mold is inserted into the outer mold.

EXAMPLE 2

A conical hollow pole is produced in a heatable conical outer mold and in a non-heatable inner mold without application of pressure. The pole consists of 20% by weight of rovings which are pre-stressed in longitudinal direction, and of phenol-formaldehyde resin. The length of the pole is 7 m., the diameter is 104 mm. at the top and 224 mm. at the bottom, the wall thickness is 12 mm. at the top and 20 mm. at the bottom. By heating the outer mold to 130° centigrade within 15 minutes the resin is cured. At this time the inner side of the pole has reached a temperature of 80 to 100° centigrade; the resin has become solid, but not hard; the inner mold is removed and is cooled to 50° centigrade by a cooling medium from outside and is thereafter straightened with rovings for the next pole. The outer mold is kept at 130° centigrade for 5 minutes and thus the resin is cured; thereafter it is cooled to 40° centigrade. Thus the pole can be easily removed. The inner mold straightened with rovings is inserted into the outer mold and the resin is filled in.

What I claim is:

1. A process for the production of substantially conical hollow particles, said process comprising cooling a first substantially conical hollow mold to a first temperature, heating a second substantially conical hollow mold to a second temperature, said first and second molds being adapted for nesting one within the other for constituting respectively an inner and outer mold, interposing between said cooled inner mold and said heated outer mold a resin mixture such that said resin mixture is nested between said inner and outer molds, maintaining said resin mixture between said inner and outer molds for a prescribed period during which said resin mixture is partially cured into a soft yet solid state, removing said inner mold from said outer mold, maintaining said resin in said outer mold for a further prescribed period to fully cure into a hardened solid state while said outer mold is maintained substantially at said second temperature, and cooling said outer mold to a third temperature less than said first temperature of said inner mold to permit a removal of said resin in its hardened solid state as a hollow conical article.

2. A process as claimed in claim 1, wherein said first temperature of said inner mold is approximately 45–50° C.

3. A process as claimed in claim 2, wherein said second temperature of said outer mold is approximately 130° C.

4. A process as claimed in claim 3, wherein said third temperature of said outer mold is approximately 30–45° C.

5. A process as claimed in claim 4, wherein said prescribed period during which said resin mixture is maintained between said inner and outer molds is approximately 15 minutes.

6. A process as claimed in claim 5, wherein said further prescribed period during which said resin mixture is maintained in said outer mold is approximately 5 minutes.

7. A process as claimed in claim 6, wherein said resin mixture includes phenol-formaldehyde.

References Cited

UNITED STATES PATENTS

| | | | |
|---|---|---|---|
| 2,527,387 | 10/1950 | Arndt | 264—327 |
| 2,804,653 | 9/1957 | Talalay | 264—338X |
| 2,854,698 | 10/1958 | Youngs | 264—327X |
| 3,129,270 | 4/1964 | Hood | 264—327X |

ROBERT F. WHITE, Primary Examiner

R. R. KUCIA, Assistant Examiner

U.S. Cl. X.R.

264—336